(12) United States Patent
Sip

(10) Patent No.: US 9,094,950 B2
(45) Date of Patent: Jul. 28, 2015

(54) PORTABLE COMMUNICATION APPARATUS AND METHOD FOR ESTABLISHING WIRELESS CONNECTION THEREOF

(71) Applicant: Acer Incorporated, New Taipei (TW)

(72) Inventor: Kim Yeung Sip, New Taipei (TW)

(73) Assignee: Acer Incorporated, New Taipei (TW)

( * ) Notice: Subject to any disclaimer, the term of this patent is extended or adjusted under 35 U.S.C. 154(b) by 175 days.

(21) Appl. No.: 13/684,109

(22) Filed: Nov. 21, 2012

(65) Prior Publication Data

US 2014/0073246 A1 Mar. 13, 2014

(30) Foreign Application Priority Data

Sep. 11, 2012 (TW) .............................. 101133176 A

(51) Int. Cl.
| | |
|---|---|
| *H04B 7/00* | (2006.01) |
| *H04W 76/02* | (2009.01) |
| *H04W 8/00* | (2009.01) |
| *H04W 88/06* | (2009.01) |

(52) U.S. Cl.
CPC ............ *H04W 76/025* (2013.01); *H04W 8/005* (2013.01); *H04W 88/06* (2013.01)

(58) Field of Classification Search
CPC .................................................... H04W 4/008
USPC ............................ 455/41.2, 420, 422.1, 456.1
See application file for complete search history.

(56) References Cited

U.S. PATENT DOCUMENTS

| | | | |
|---|---|---|---|
| 6,094,164 A | 7/2000 | Murphy | |
| 2008/0058031 A1 | 3/2008 | Deprun | |
| 2010/0138149 A1* | 6/2010 | Ohta et al. | .................... 455/41.2 |
| 2013/0095761 A1* | 4/2013 | Chu et al. | ..................... 455/41.2 |
| 2013/0273902 A1* | 10/2013 | Bolingbroke | .............. 455/422.1 |

FOREIGN PATENT DOCUMENTS

| | | |
|---|---|---|
| CN | 101785198 | 7/2010 |
| TW | 201212560 | 3/2012 |

* cited by examiner

*Primary Examiner* — Tuan H Nguyen
(74) *Attorney, Agent, or Firm* — Jianq Chyun IP Office

(57) ABSTRACT

A portable communication apparatus and a method for establishing a wireless connection thereof are provided. The method is adapted to the portable communication apparatus establishing the wireless connection with at least one peripheral apparatus by using a first wireless communication module and a second wireless communication module, in which a signal range of the first wireless communication module is larger than that of the second wireless communication module. In the present method, at least one peripheral apparatus located within the signal range of the first wireless communication module is searched by using the first wireless communication module, and a first wireless connection with the searched peripheral apparatus is established. Next, state information of a corresponding second wireless communication on each peripheral apparatus is obtained through the first wireless connection. Then, a second wireless connection with the at least one apparatus is established by using the second wireless communication module.

19 Claims, 6 Drawing Sheets

PORTABLE COMMUNICATION APPARATUS AND METHOD FOR ESTABLISHING WIRELESS CONNECTION THEREOF

CROSS-REFERENCE TO RELATED APPLICATION

This application claims the priority benefit of Taiwan application serial no. 101133176, filed on Sep. 11, 2012. The entirety of the above-mentioned patent application is hereby incorporated by reference herein and made a part of this specification.

BACKGROUND

1. Technical Field

The invention relates to a method for establishing a connection of an apparatus. Particularly, the invention relates to a method for establishing wireless connection in two stages and a potable communication apparatus.

2. Related Art

A wireless gigabit alliance (WiGig) is a wireless transmission technique of data transmission performed on a 60 GHz frequency band in multi-gigabit per second. When a WiGig wireless docking is applied to connection between a consumer electronic product and a peripheral apparatus, it can break through a limit of a transmission speed of the conventional wireless fidelity (Wi-Fi), and provides an actual transmission speed that is 10 times faster than that of the Wi-Fi to reach a speed of multi-gigabit per second. The high-speed transmission performance provided by the WiGig not only greatly decreases a data transmission time between the apparatuses, but also simplifies a conventional wired connection method that uses a transmission cable, which provides a simple and quick data transmission solution.

However, the WiGig is a point-to-point communication technique, which uses an authentication mechanism of a Wi-Fi protected setup (WPS) as in-band discovery and pairing mechanism. Since the WiGig wireless docking can be only paired to a single apparatus, once it is paired or connected to an apparatus, the other apparatuses cannot establish connection with it, and even cannot search such wireless docking. Moreover, since a 60 Ghz radio signal has a high frequency, a path attenuation thereof is severe compared to that of a 2.5 Ghz system, and a transmission distance of a WiGig signal (3.5 Gbps) within a line-of-sight is only 15 feet, which is obviously shorter than a transmission distance of 160 feet that is provided by a bluetooth 4.0 technique. The features of single apparatus connection and short transmission distance of the WiGig result in a fact that the WiGig wireless docking is hard to be searched or connected in an actual application.

SUMMARY

Accordingly, the invention is directed to a portable communication apparatus and a method for establishing a wireless connection thereof, which helps a user to easily search or connect a wireless gigabit alliance (WiGig) wireless docking.

The invention provides a method for establishing a wireless connection, which is adapted to a portable communication apparatus establishing the wireless connection with at least one peripheral apparatus by using a first wireless communication module and a second wireless communication module, where a signal range of the first wireless communication module is larger than that of the second wireless communication module. In the method, the peripheral apparatus located within the signal range of the first wireless communication module is searched and a first wireless connection with the searched peripheral apparatus is established by using the first wireless communication module. Then, state information of the corresponding second wireless communication module on each peripheral apparatus is obtained through the first wireless connection. Finally, a second wireless connection with the peripheral apparatus is established according to the state information by using the second wireless communication module.

The invention provides a portable communication apparatus including a first wireless communication module, a second wireless communication module and a processing unit, in which a signal range of the first wireless communication module is larger than that of the second wireless communication module. The first wireless communication module searches at least one peripheral apparatus within a signal range thereof, and establishes a first wireless connection with the searched peripheral apparatus. The processing unit is coupled to the first wireless communication module and the second wireless communication module, and obtains state information of the corresponding second wireless communication module on each peripheral apparatus through the first wireless connection, and establishes a second wireless connection with the peripheral apparatus according to the state information by using the second wireless communication module.

Based on the above descriptions, according to the portable electronic apparatus and the method for establishing the wireless connection thereof, a wireless connection with the peripheral apparatus is established through the wireless communication module with a larger signal range (for example, bluetooth), and state information of the wireless communication module with a smaller signal range (for example, WiGig) is obtained for establishing the wireless connection with the peripheral apparatus. In this way, the problem of the related art that the WiGig wireless docking cannot be searched or connected is resolved.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

In the invention, a communication module with a larger signal range such as bluetooth or wireless fidelity and a communication module with a smaller signal range and a fast speed such as wireless gigabit alliance (WiGig) are respectively configured on a portable communication apparatus and a docking thereof. In this way, the portable communication apparatus can first search the peripheral dockings by using the communication module with a larger signal range, and obtain state information of the communication module with a faster speed, which facilitates a user to select the peripheral docking to establish connection, or indicate the user to approach to the docking to establish the connection, so as to achieve high speed data transmission.

Figure 1:
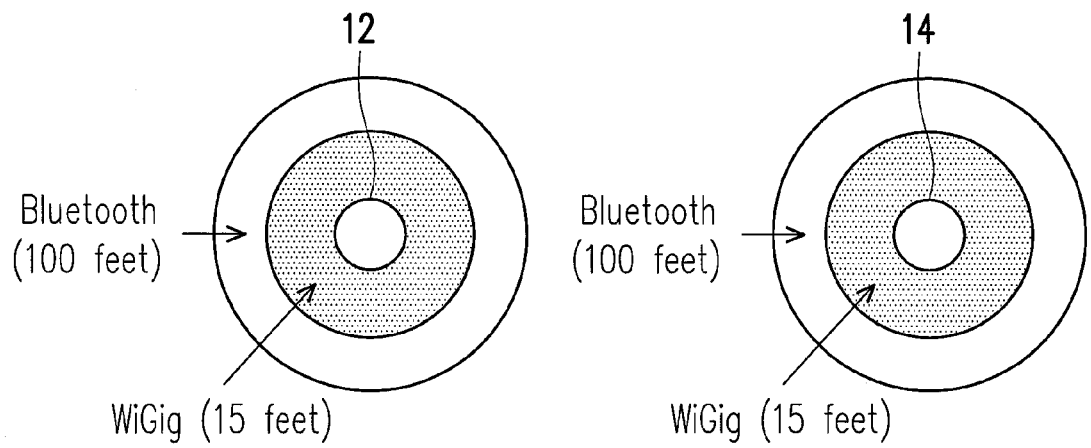
FIG. 1 is a schematic diagram of a method for establishing a wireless connection according to an embodiment of the invention.

FIG. 1 is a schematic diagram of a method for establishing a wireless connection according to an embodiment of the invention. Referring to FIG. 1, in the present embodiment, a bluetooth module and a WiGig module are respectively disposed on a potable communication apparatus 12 and a docking 14 thereof for providing wireless connections of two stages. A signal coverage range of the bluetooth module under an advertising mode may reach 100 feet, and a signal coverage range of the WiGig module is about 15 feet. The docking 14, for example, continually turns on the bluetooth module, and is operated under a lower power (LE) advertising mode. The portable electronic apparatus 12 can search and pair to the docking 14 and establish a connection with the docking 14.

Figure 2:
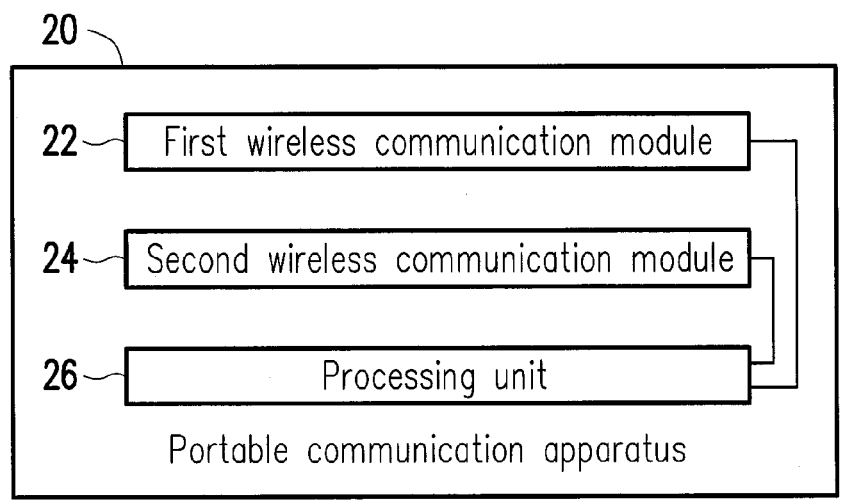
FIG. 2 is a block diagram of a portable communication apparatus according to an embodiment of the invention.

FIG. 2 is a block diagram of a portable communication apparatus according to an embodiment of the invention. Referring to FIG. 2, the portable communication apparatus 20 is, for example, a mobile phone, a personal digital assistant, a notebook computer, a tablet computer, etc., which corresponds to the portable communication apparatus 12 of the aforementioned embodiment. The portable communication apparatus 20 includes a first wireless communication module 22, a second wireless communication module 24 and a processing unit 26, and functions thereof are described as follows.

The first wireless communication module 22 is, for example, a device that support a communication protocol such as wireless fidelity (Wi-Fi), bluetooth or radio-frequency identification (RFID), which can provide a larger signal coverage range and enable the portable communication apparatus 20 to search peripheral apparatuses within a larger peripheral range and establish wireless connections therewith.

The second wireless communication module 24 is, for example, a device that support a communication protocol of WiGig, etc., which can provide a wireless signal with a smaller signal range and a faster data transmission speed, so as to enable the portable communication apparatus 20 to establish a high-speed wireless connection with the peripheral apparatus.

The processing unit 26 is, for example, a central processing unit (CPU), a microprocessor, a digital signal processor (DSP), an application specific integrated circuit (ASIC) or other similar devices, which is respectively coupled to the first wireless communication module 22 and the second wireless communication module 24, and uses the first wireless communication module 22 and the second wireless communication module 24 to search the peripheral apparatus and establish a wireless connection therewith.

Figure 3:
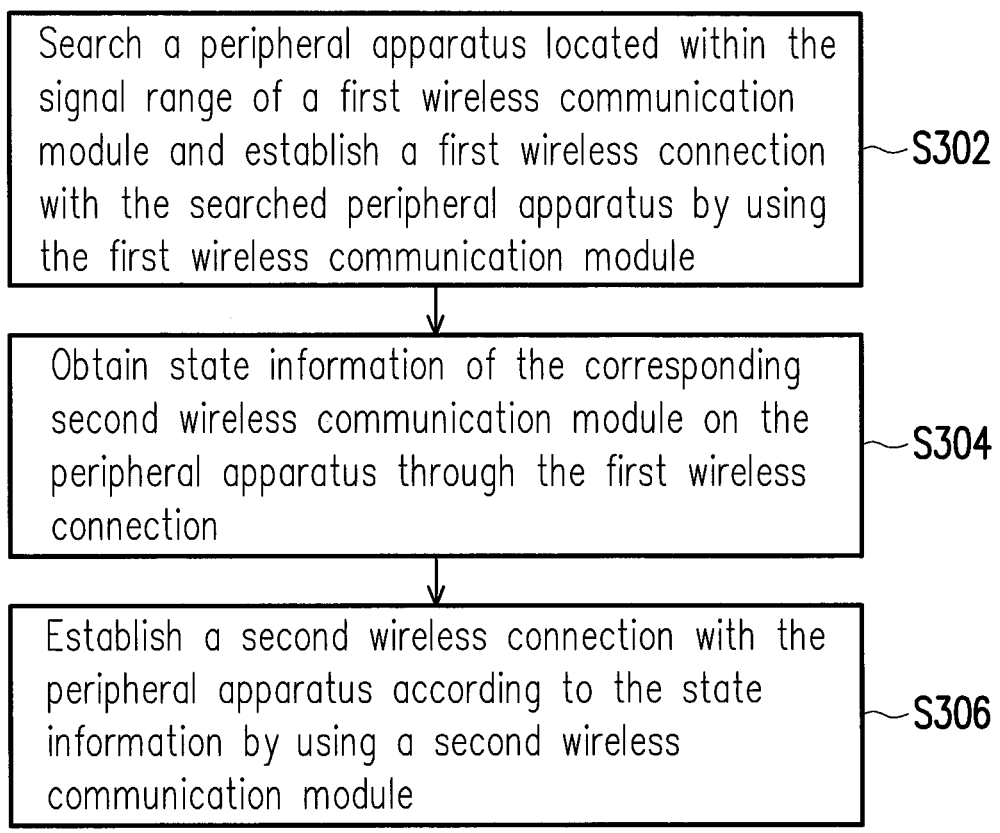
FIG. 3 is a flowchart illustrating a method for establishing a wireless connection according to an embodiment of the invention.

FIG. 3 is a flowchart illustrating a method for establishing a wireless connection according to an embodiment of the invention. Referring to FIG. 3, the method of the present embodiment is adapted to the portable communication apparatus 20. Detailed steps of the method of the embodiment are described below with reference to various components of the portable communication apparatus 20.

First, the processing unit 26 searches a peripheral apparatus within a signal range of the first wireless communication module 22, and establishes a first wireless connection with the searched peripheral apparatus by using the first wireless communication module 22 (step S302). The first wireless connection is, for example, a bluetooth or Wi-Fi wireless connection, which is not limited by the invention.

Then, the processing unit 26 obtains state information of the corresponding second wireless communication module on each peripheral apparatus through the first wireless connection with the searched peripheral apparatus established by the first wireless communication module 22 (step S304). The state information includes that the second wireless communication of the peripheral apparatus is "used", "paired and connectable" or "pairable and connectable" (i.e. never paired before).

Then, the processing unit 26 establishes a second wireless connection with the peripheral apparatus according to the state information by using the second wireless communication module 24 (step S306). The processing unit 26, for example, automatically selects the peripheral apparatus to be connected to establish the connection or the user manually selects the peripheral apparatus to be connected to establish the connection according to states of the second wireless communication of the peripheral apparatus of "used", "paired and connectable" or "pairable and connectable", etc.

In detail, in an embodiment, when the obtained state information of the peripheral apparatus is "paired and connectable", the processing unit 26, for example, first accesses pairing information of the previous pairing, and pairs with the peripheral apparatus by using the second wireless communication module 24 and the pairing information, so as to establish the second wireless connection. When the state information of a plurality of peripheral apparatuses is "paired and connectable", the processing unit 26, for example, selects one of the peripheral apparatuses to establish the connection according to a priority sequence. The priority sequence is, for example, determined according to signal strengths or transmission speeds of the peripheral apparatuses, which is not limited by the invention.

In another embodiment, the processing unit 26, for example, prompts the user to input pairing information when the obtained state information of the peripheral apparatus is "pairable and connectable" (i.e. never paired before), and pairs with the peripheral apparatus by using the second wireless communication module 24 and the pairing information, so as to establish the second wireless connection.

According to the aforementioned method for establishing the wireless connection, the portable communication apparatus 20 first establishes the wireless connection with the peripheral apparatuses within a larger peripheral range by using the first wireless communication module 22, and then establishes the wireless connection with the peripheral apparatus in which the second wireless communication module is still not used, so as to achieve the high-speed data transmission.

It should be noticed that since the signal range of the second wireless communication module 24 is smaller, when the portable communication apparatus 20 tries to establish the wireless connection with the second wireless communication module of the peripheral apparatus, the connection is probably unsuccessful due to excessively far distance. Accordingly, the invention further determines a position of the peripheral apparatus according to the signal of the first wireless communication module of the peripheral apparatus that is received by the first wireless communication module 22, so as to instruct the user to approach to the peripheral apparatus to establish the wireless connection with the second wireless communication module of the peripheral apparatus. Another embodiment is provided below for detailed descriptions.

Figure 4:
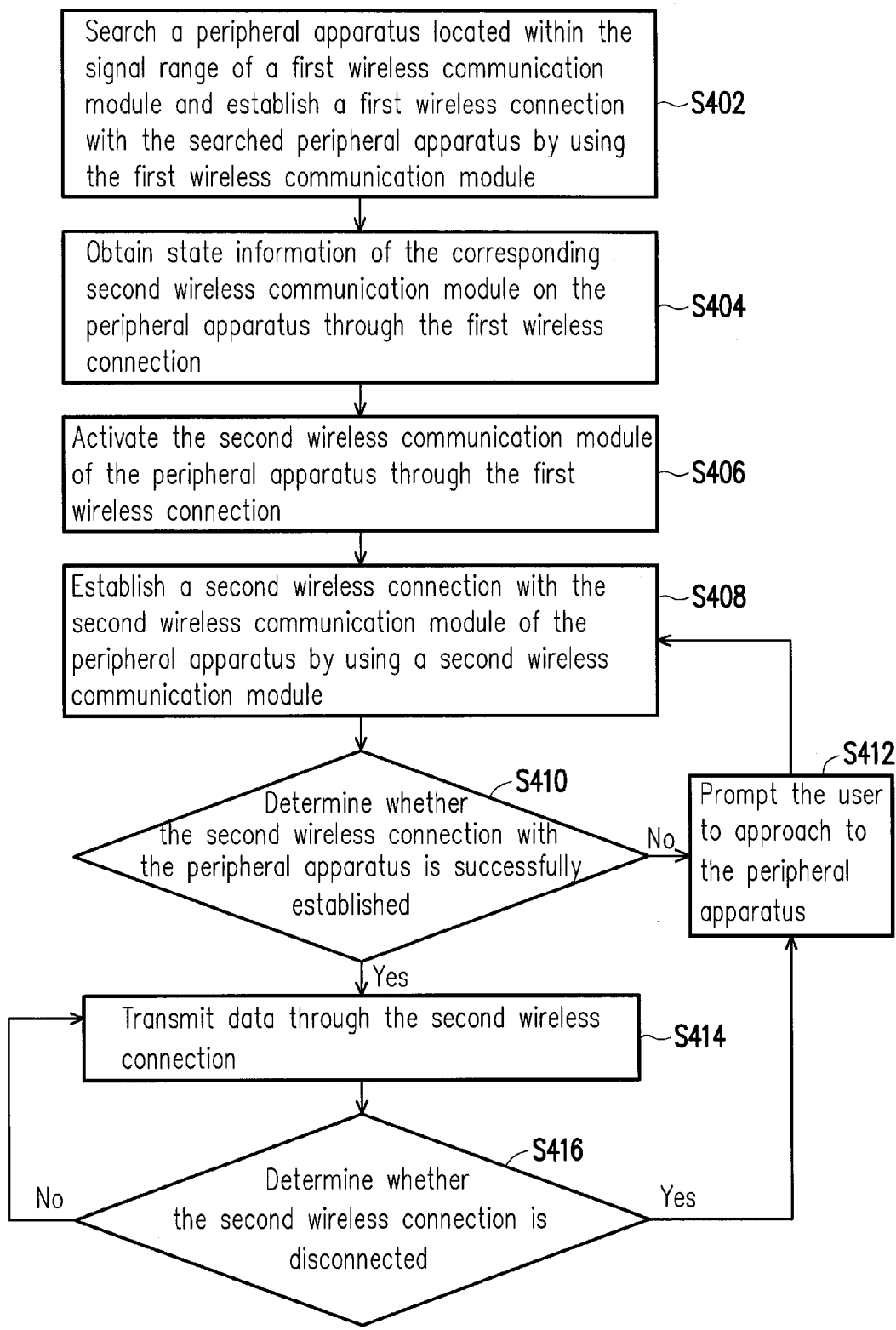
FIG. 4 is a flowchart illustrating a method for establishing a wireless connection according to an embodiment of the invention.

FIG. 4 is a flowchart illustrating a method for establishing a wireless connection according to an embodiment of the invention. Referring to FIG. 4, the method of the present embodiment is adapted to the portable communication apparatus 20. Detailed steps of the method of the embodiment are described below with reference to various components of the portable communication apparatus 20.

First, the processing unit 26 searches a peripheral apparatus within a signal range of the first wireless communication module 22 and establishes a first wireless connection with the searched peripheral apparatus by using the first wireless communication module 22 (step S402).

Then, the processing unit 26 obtains state information of the corresponding second wireless communication module on each peripheral apparatus through the first wireless connection with the searched peripheral apparatus established by the first wireless communication module 22 (step S404). The steps S402 and S404 are the same or similar to the steps S302 and S304 of the aforementioned embodiment, and technical contents thereof are not repeated.

Different from the aforementioned embodiment, in the present embodiment, after the state information of the peripheral apparatus is obtained, the processing unit 26 first uses the first wireless communication module 22 to control the peripheral apparatus to activate the second wireless communication module thereof through the first wireless connection (step S406), and then uses the second wireless communication module 24 to establish a second wireless connection with the second wireless communication module of the peripheral apparatus (step S408). In brief, the second wireless communication module of the peripheral apparatus is originally turned off, and is turned on under control of the portable communication apparatus 20, by which power consumption of the peripheral apparatus is saved.

Moreover, in the process that the processing unit 26 tries to establish the second wireless connection with the second wireless communication module of the peripheral apparatus, it is further determined whether the wireless connection with the peripheral apparatus is successfully established (step S410).

If not, the processing unit 26 prompts the user of the portable communication apparatus 20 to approach to the peripheral apparatus (step S412), and continually uses the second wireless communication module 24 to try to establish the second wireless connection with the peripheral apparatus (step S408). The processing unit 26, for example, uses the first wireless communication module 22 to detect a strength change of the wireless signal sent by the first wireless communication module of the peripheral apparatus, so as to determine a direction of the peripheral apparatus relative to the portable communication apparatus 20, and prompts such direction on the portable communication apparatus 20 to instruct the user to approach to the peripheral apparatus.

On the other hand, if the second wireless connection with the peripheral apparatus is successfully established, the processing unit 26 can use the second wireless connection to transmit data to the peripheral apparatus (step S414). The processing unit 26 can further turn off the first wireless communication module and the established first wireless connection to save power.

Moreover, after the second wireless connection with the peripheral apparatus is established, the processing unit 26 continually determines whether the second wireless connection established by the second wireless communication module is disconnected (step S416). If the second wireless connection is disconnected, the processing unit 26 prompts the user to approach to the peripheral apparatus (step S412), and continually uses the second wireless communication module 24 to establish the second wireless connection with the peripheral apparatus (step S410). If the second wireless connection is not turned off, the processing unit 26 still uses the second wireless connection to transmit data with the peripheral apparatus (step S414).

According to the aforementioned method for establishing the wireless connection, the portable communication apparatus 20 maintains the wireless connection with the peripheral apparatus, so as to achieve high-speed data transmission.

It should be noticed that that regarding the state information of the second wireless communication module of the peripheral apparatus of "used", "paired and connectable" or "pairable and connectable" (i.e. never paired before), the processing unit 26, for example, further displays an operation interface on a screen (not shown) of the portable communication apparatus 20 to display the state information of the peripheral apparatuses and corresponding operation keys, by which the user learns the states of the peripheral apparatuses, and selects the peripheral apparatus to be connected, so as to establish the wireless connection.

Figure 5:
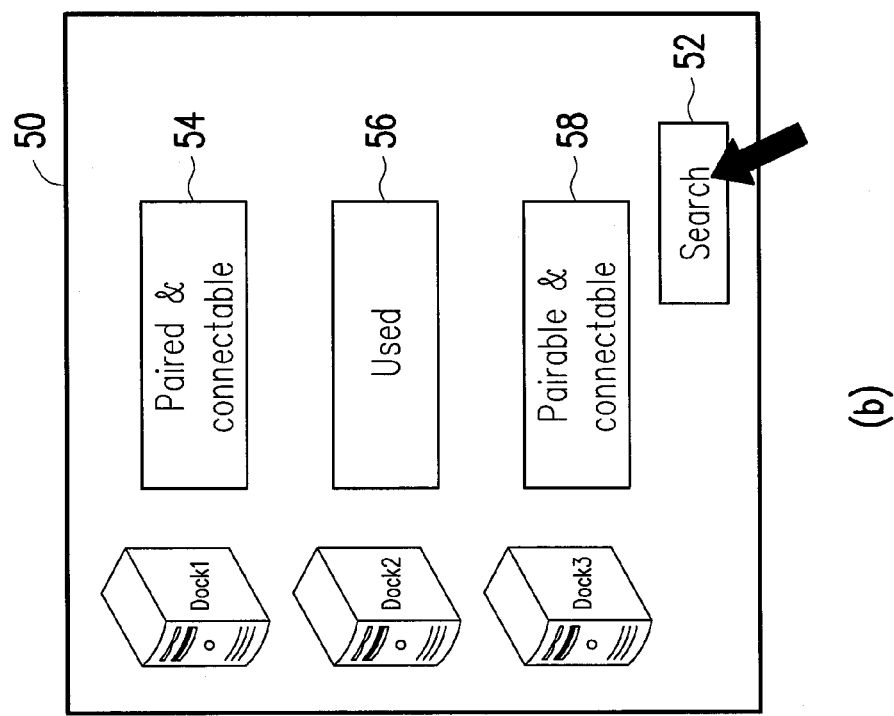
FIGS. 5(a)-(b) are examples of a method for establishing a wireless connection according to an embodiment of the invention.
Figure 5:
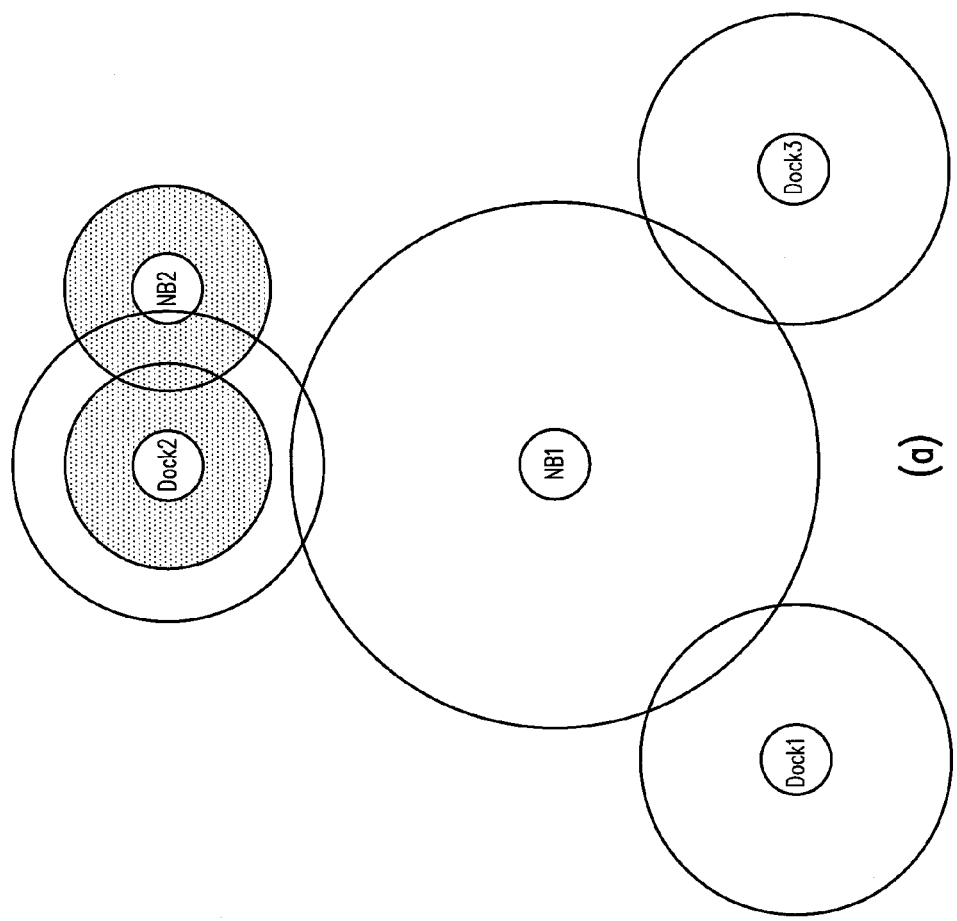

For example, FIGS. 5(a)-(b), FIGS. 6(a)-(b) and FIGS. 7(a)-(b) are respectively examples of the method for establishing a wireless connection according to an embodiment of the invention. Referring to FIG. 5(a) and FIG. 5(b), it is assumed that dockings Dock1-Dock3 are disposed at peripheral of a notebook computer NB1, and the dockings Dock1-Dock3 all activate bluetooth modules therein. Moreover, the docking Dock2 further activates a WiGig module and establishes a wireless connection of WiGig with a notebook computer NB2. The Notebook computer NB1, for example, displays an operation interface 50 shown as FIG. 5(b) on the screen, and the user of the notebook computer NB1 can press a search key 52 in the operation interface 50 to activate the bluetooth module of the notebook computer NB1 to search surrounding peripheral apparatuses.

Since a signal range of the bluetooth module of the notebook computer NB1 is overlapped to the signal ranges of the bluetooth modules of the dockings Dock1-Dock3, the notebook computer NB1 can detect the dockings Dock1-Dock3, and establish wireless connections of bluetooth with the dockings Dock1-Dock3, so as to obtain state information of WiGig modules of the dockings Dock1-Dock3. Moreover, the notebook computer NB1 can further displays the states of the dockings Dock1-Dock3 on the operation interface 50 according to the obtained state information. As shown in FIG. 5(b), the notebook computer NB1 can display a state key 54 in the operation interface 50 to present the state of the docking Dock1 as "paired & connectable", display a state key 56 to present the state of the docking Dock2 as "used", and display a state key 58 to present the state of the docking Dock3 as "pairable & connectable".

Figure 6:
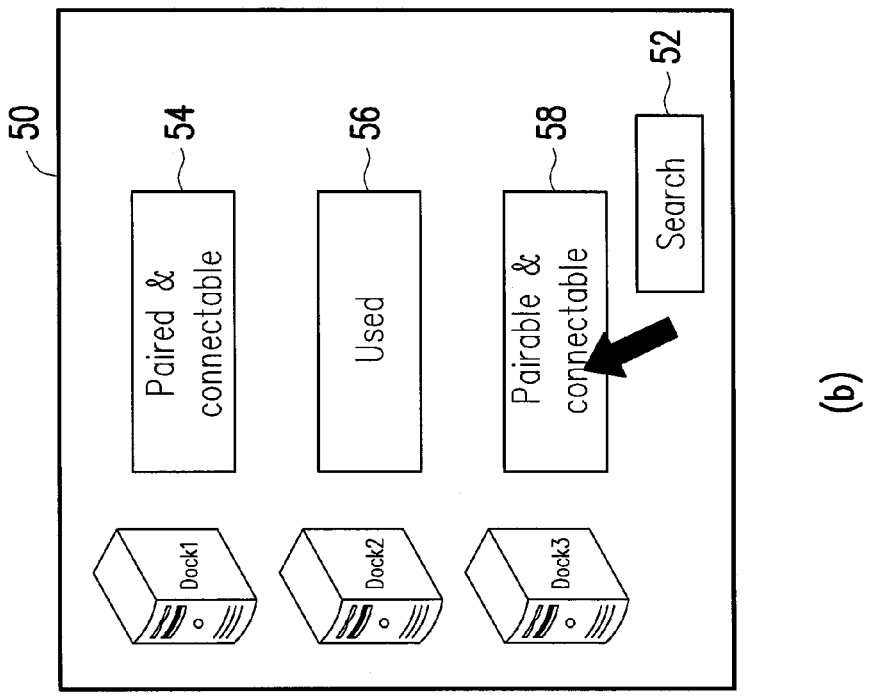
FIGS. 6(a)-(b) are examples of a method for establishing a wireless connection according to an embodiment of the invention.
Figure 6:
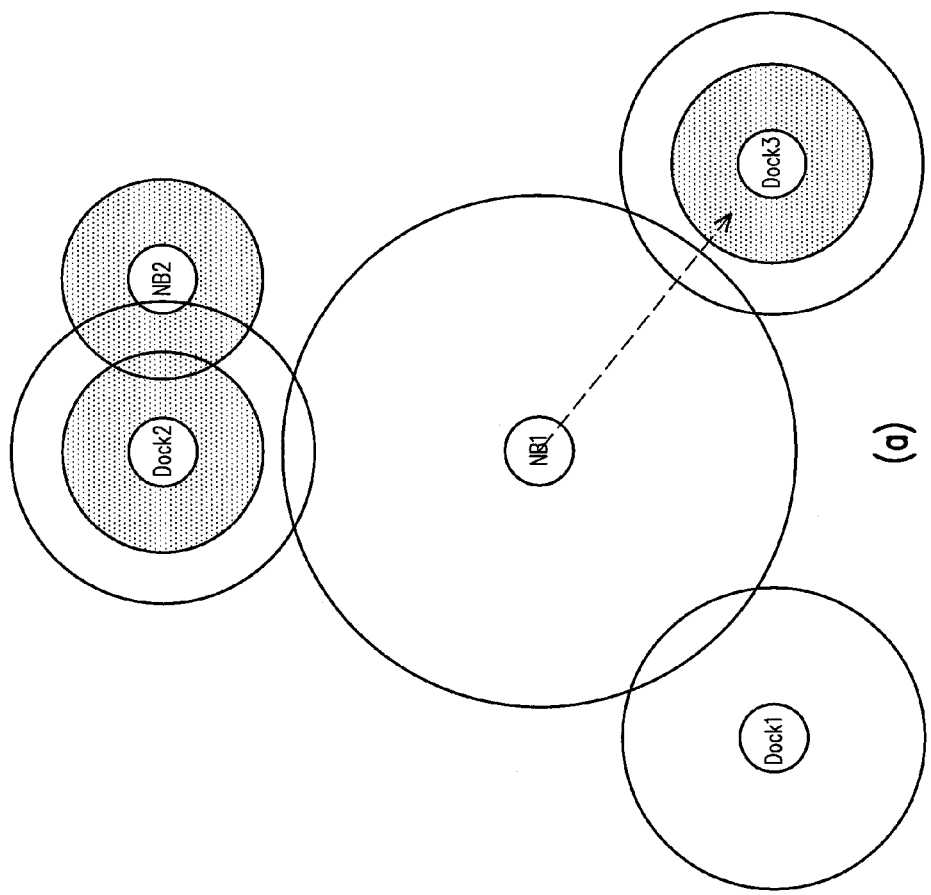

Then, referring to FIG. 6(a) and FIG. 6(b), when the user wants to connect the docking Dock3, the user can press the state key 58 in the operation interface 50. At this time, the notebook computer NB1 activates the WiGig module thereof, and tries to establish the wireless connection of WiGig with the docking Dock3. However, since the distance between the notebook computer NB1 and the docking Dock3 is too far, the signal range of the WiGig module of the notebook computer NB1 is not overlapped to the signal range of the WiGig module of the docking Dock3, and the wireless connection of WiGig cannot be successfully established. Meanwhile, the notebook computer NB1 may determine a direction of the docking Dock 3 relative to the notebook computer NB1 according to the wireless signal of the bluetooth module of the docking Dock3 detected by the bluetooth module of the notebook computer NB1, and instructs the user to approach to the docking Dock3, so as to successfully establish the wireless connection of WiGig with the WiGig module of the docking Dock3.

Figure 7:
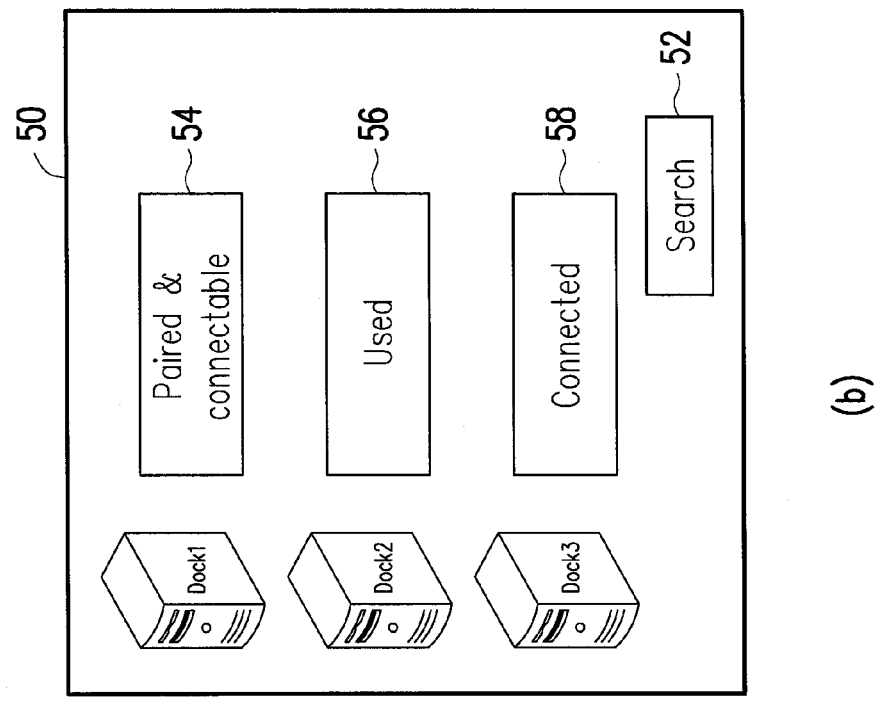
FIGS. 7(a)-(b) are examples of a method for establishing a wireless connection according to an embodiment of the invention.
Figure 7:
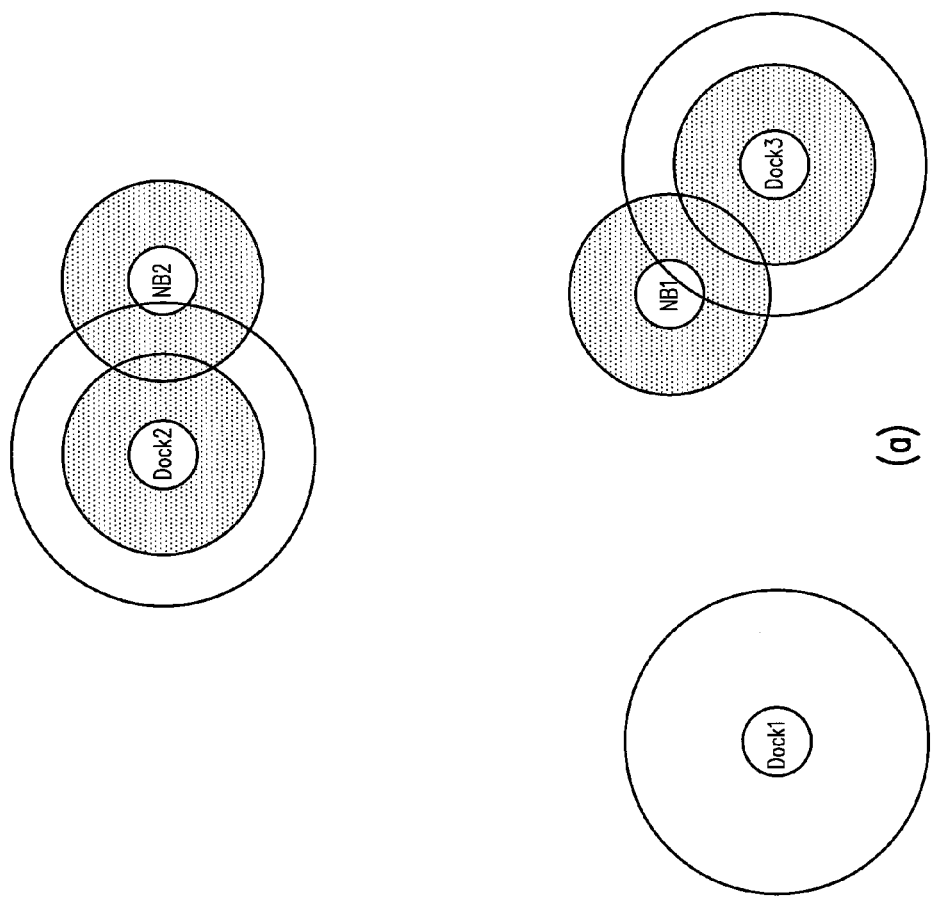

Finally, referring to FIG. 7(a) and FIG. 7(b), when the notebook computer NB1 approaches to the docking Dock3, the signal range of the WiGig module of the notebook computer NB1 is overlapped to the signal range of the WiGig module of the docking Dock3, and the notebook computer NB1 can successfully establish the wireless connection of WiGig with the docking Dock3. After the wireless connection is established, the notebook computer NB1 can display the state key 58 in the operation interface 50 to indicate the state of the docking Dock3 as "connected".

In summary, the portable electronic apparatus and the method for establishing the wireless connection thereof, the wireless connections with the peripheral apparatus are established in tandem by using the wireless communication modules with different signal ranges, by which besides a wireless connection range of the portable communication apparatus is expanded, the user can learn the states of the peripheral apparatuses, so as to select the peripheral apparatus to establish the wireless connection. In this way, the problem of the related art that the WiGi wireless docking cannot be searched or connected is resolved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for establishing a wireless connection, adapted to a portable communication apparatus establishing the wireless connection with at least one peripheral apparatus by using a first wireless communication module and a second wireless communication module, wherein a signal range of the first wireless communication module is larger than that of the second wireless communication module, the method for establishing the wireless connection comprising:
    searching the peripheral apparatus located within the signal range of the first wireless communication module and establishing a first wireless connection with the searched peripheral apparatus by using the first wireless communication module;
    obtaining state information of the corresponding second wireless communication module on the peripheral apparatus through the first wireless connection; and
    establishing a second wireless connection with the peripheral apparatus according to the state information by using the second wireless communication module.

2. The method for establishing the wireless connection as claimed in claim 1, wherein the state information comprises that the second wireless communication of the peripheral apparatus is "used", "paired and connectable" or "pairable and connectable".

3. The method for establishing the wireless connection as claimed in claim 2, wherein the step of establishing the second wireless connection with the peripheral apparatus according to the state information by using the second wireless communication module comprises:
    accessing pairing information of a previous pairing when the state information is "paired and connectable"; and
    pairing with the peripheral apparatus by using the second wireless communication module and the pairing information to establish the second wireless connection.

4. The method for establishing the wireless connection as claimed in claim 2, wherein the step of establishing the second wireless connection with the peripheral apparatus according to the state information by using the second wireless communication module comprises:
    prompting a user to input pairing information when the state information is "pairable and connectable"; and
    pairing with the peripheral apparatus by using the second wireless communication module and the pairing information to establish the second wireless connection.

5. The method for establishing the wireless connection as claimed in claim 1, wherein the step of establishing the second wireless connection with the peripheral apparatus according to the state information by using the second wireless communication module comprises:
    using the first wireless communication module to control the peripheral apparatus to activate the second wireless communication module thereof through the first wireless connection; and
    using the second wireless communication module to establish the second wireless connection with the second wireless communication module of the peripheral apparatus.

6. The method for establishing the wireless connection as claimed in claim 1, wherein the step of establishing the second wireless connection with the peripheral apparatus according to the state information by using the second wireless communication module comprises:
    determining whether the second wireless connection with the peripheral apparatus is successfully established; and
    if not, prompting a user to approach to the peripheral apparatus, and continually using the second wireless communication module to establish the second wireless connection with the peripheral apparatus.

7. The method for establishing the wireless connection as claimed in claim 6, wherein the step of prompting the user to approach to the peripheral apparatus comprises:
    detecting a direction of a wireless signal sent by the first wireless communication module of the peripheral apparatus, and prompting the direction to instruct the user to approach to the peripheral apparatus.

8. The method for establishing the wireless connection as claimed in claim 6, wherein after the step of determining whether the second wireless connection with the peripheral apparatus is successfully established, the method further comprises:
    turning off the first wireless communication module and the established first wireless connection when the second wireless connection is successfully established.

9. The method for establishing the wireless connection as claimed in claim 1, wherein after the step of establishing the second wireless connection with the peripheral apparatus according to the state information by using the second wireless communication module, the method comprises:

determining whether the established second wireless connection is disconnected; and if yes, prompting a user to approach to the peripheral apparatus, and continually using the second wireless communication module to establish the second wireless connection with the peripheral apparatus.

10. The method for establishing the wireless connection as claimed in claim 1, wherein the first wireless communication module uses a bluetooth technique, and the second wireless communication module uses a wireless gigabit alliance (Wi-Gig) technique.

11. A portable communication apparatus, comprising:
a first wireless communication module, configured to search at least one peripheral apparatus within a signal range thereof, and establish a first wireless connection with the searched peripheral apparatus;
a second wireless communication module, wherein a signal range of the first wireless communication module is larger than that of the second wireless communication module; and
a processing unit, coupled to the first wireless communication module and the second wireless communication module, and configured to obtain state information of the corresponding second wireless communication module on each peripheral apparatus through the first wireless connection, and establish a second wireless connection with the peripheral apparatus according to the state information by using the second wireless communication module.

12. The portable communication apparatus as claimed in claim 11, wherein the state information comprises that the second wireless communication of the peripheral apparatus is "used", "paired and connectable" or "pairable and connectable".

13. The portable communication apparatus as claimed in claim 12, wherein the processing unit accesses pairing information of a previous pairing when the obtained state information is "paired and connectable", and pairs with the peripheral apparatus by using the second wireless communication module and the pairing information to establish the second wireless connection.

14. The portable communication apparatus as claimed in claim 12, wherein the processing unit prompts a user to input pairing information when the obtained state information is "pairable and connectable", and pairs with the peripheral apparatus by using the second wireless communication module and the pairing information to establish the second wireless connection.

15. The portable communication apparatus as claimed in claim 11, wherein the processing unit uses the first wireless communication module to control the peripheral apparatus to activate a second wireless communication module thereof through the first wireless connection, and uses the second wireless communication module to establish the second wireless connection with the second wireless communication module of the peripheral apparatus.

16. The portable communication apparatus as claimed in claim 11, wherein the processing unit determines whether the second wireless connection with the peripheral apparatus is successfully established, and if not, the processing unit prompts a user to approach to the peripheral apparatus, and continually uses the second wireless communication module to establish the second wireless connection with the peripheral apparatus.

17. The portable communication apparatus as claimed in claim 16, wherein the processing unit detects a direction of a wireless signal sent by the first wireless communication module of the peripheral apparatus by using the first wireless communication module, and prompts the direction to instruct the user to approach to the peripheral apparatus.

18. The portable communication apparatus as claimed in claim 16, wherein the processing unit turns off the first wireless communication module and the established first wireless connection when the second wireless connection is successfully established.

19. The portable communication apparatus as claimed in claim 11, wherein the processing unit determines whether the second wireless connection established by the second wireless module is disconnected, and if yes, the processing unit prompts a user to approach to the peripheral apparatus, and continually uses the second wireless communication module to establish the second wireless connection with the peripheral apparatus.

* * * * *